United States Patent [19]

Yusa et al.

[11] 4,345,043

[45] Aug. 17, 1982

[54] VINYL CHLORIDE RESIN COMPOSITION

[75] Inventors: Haruhiko Yusa; Masanori Oota; Haruki Isaka, all of Iwaki, Japan

[73] Assignee: Kureha Kagaku Kogyo Kabushiki Kaisha, Tokyo, Japan

[21] Appl. No.: 183,833

[22] Filed: Sep. 3, 1980

[30] Foreign Application Priority Data

Sep. 3, 1979 [JP] Japan .................... 54-112601

[51] Int. Cl.$^3$ .............................................. C08K 9/00
[52] U.S. Cl. .................................... 523/209; 524/497; 524/567
[58] Field of Search .............. 260/42.14, 42.49, 42.53

[56] References Cited

U.S. PATENT DOCUMENTS

| | | | |
|---|---|---|---|
| 2,876,133 | 3/1959 | Iler et al. ........................ | 260/42.14 |
| 3,133,893 | 5/1964 | Newman .......................... | 260/42.14 |
| 3,470,278 | 9/1969 | Weber ............................ | 260/42.14 |
| 3,884,871 | 5/1975 | Herman et al. .................. | 260/42.14 |
| 3,996,173 | 12/1976 | Heichele et al. ................. | 260/42.49 |
| 4,235,768 | 11/1980 | Ritter et al. .................... | 260/42.14 |

*Primary Examiner*—Lewis T. Jacobs
*Attorney, Agent, or Firm*—Wenderoth, Lind & Ponack

[57] ABSTRACT

Modified titanium oxide is prepared by polymerizing a mixture of vinyl chloride and a carboxylic monomer such as 10-undecenoic acid in the presence of titanium oxide. The thus obtained, modified titanium oxide is mixed with a vinyl chloride resin, typically, polyvinyl chloride to give a vinyl chloride resin composition having an improved weatherability and being substantially free of serious drawbacks accompanying the addition of conventional titanium oxide such as plating out during extrusion and decrease in extrusion throughput.

6 Claims, No Drawings

VINYL CHLORIDE RESIN COMPOSITION

FIELD OF THE INVENTION

The present invention relates to a vinyl chloride resin composition possessing improved weatherability as well as satisfactory processability and mechanical properties.

DESCRIPTION OF THE PRIOR ART

It is known in the art to blend titanium oxide with a vinyl chloride resin in order to improve the weatherability of formed products of a vinyl chloride resin composition, particularly those for outdoor use such as pipes and building materials.

However, if a vinyl chloride resin composition blended with titanium oxide is subjected to extrusion molding, the titanium oxide is deposited on the inner wall of the cylinder portion, especially in the die portion of the extruder, and plates out unevenly on the surface of the moldings obtained, resulting in a poorer appearance and thus impairing the commercial value of the moldings. For this reason, it becomes necessary to clean the extruder frequently whereby the process efficiency is lowered materially.

These drawbacks are particularly serious when lead-containing compounds are used as stabilizers. Further, as the quantity of titanium oxide added increases, the load of extrusion molding becomes heavier due to increased extrusion resistance, resulting in a reduced extrusion throughput, which is a serious problem in the production of resin compositions. Furthermore, the addition of titanium oxide deteriorates the mechanical properties such as impact strength and tensile strength of formed resin products, in particular, it lowers the impact strength of a vinyl chloride resin composition comprising an impact strength modifier.

These drawbacks accompanying the use of titanium oxide are due to its intensive agglomeration and poor compatibility with a vinyl chloride resin, and it is therefore difficult to obtain uniformly kneaded and molded products by an ordinary molding machine.

While the weatherability of a vinyl chloride resin composition improves depending upon the quantity of titanium oxide added to the vinyl chloride resin, the above described drawbacks conversely increase. Thus, a solution has been sought by which the improvement arising from the addition of titanium oxide can be attained without being accompanied by serious drawbacks thereof.

Many attempts have been proposed to overcome the shortcomings of titanium oxide addition. To date, a method in which titanium oxide is subjected to a surface treatment with a metal salt, surfactant or silane coupling agent, or a method in which a diorganopolysiloxane and a polyhydric alcohol are added to a vinyl chloride resin composition comprising titanium oxide have been reported. In accordance with these methods, the titanium oxide obtained actually has improved dispersibility in the vinyl chloride resin, but the degree of the improvement is not sufficient.

SUMMARY OF THE INVENTION

A principal object of the present invention is to solve the foregoing problems and to provide a vinyl chloride resin composition possessing improved weatherability while retaining a satisfactory level of processability and mechanical properties.

As a result of our extensive study of the problems set forth previously, it has been found that a satisfactory resin composition can be obtained by blending a vinyl chloride resin with modified titanium oxide, instead of titanium oxide per se, obtained by radical-polymerizing a monomer mixture of vinyl chloride and a carboxylic monomer copolymerizable therewith having a double bond and at least one carboxylic group in the presence of titanium oxide. The resin composition thus obtained has been found to have excellent weatherability and mechanical properties while effectively avoiding the plating out of the titanium oxide and remarkably reducing the increase in load of extrusion molding.

More particularly, the vinyl chloride resin composition of the present invention comprises a vinyl chloride resin and modified titanium oxide and has a titanium oxide content of 0.1 to 30% based on the total amount of said vinyl chloride resin and said modified titanium oxide, said modified titanium oxide having been obtained by copolymerizing a monomer mixture of vinyl chloride and a carboxylic monomer copolymerizable therewith having at least one carboxylic group in the presence of titanium oxide, said modified titanium oxide comprising 30 to 2,000 parts of the resulting copolymer with respect to 100 parts of titanium oxide, the copolymer in the modified titanium oxide comprising 0.1 to 70% thereof of the polymerized units of said carboxylic monomer, all quantities in percentages and parts set forth above and elsewhere herein being by weight.

Remarkable advantages can be obtained by the use of the above described modified titanium oxide presumably because the surfaces of the titanium oxide particles have been modified by radical-polymerizing a monomer mixture of vinyl chloride and a carboxylic monomer copolymerizable therewith having a double bond and at least one carboxylic group (hereinafter referred to simply as a carboxylic monomer).

A characteristic feature of the present invention is that a monomer mixture of a carboxylic monomer and vinyl chloride is subjected to polymerization in the presence of titanium oxide. The addition of the carboxylic monomer as one copolymerization component enhances the affinity between the vinyl chloride copolymer and titanium oxide to form a more intimate titanium oxide-vinyl chloride resin composite, whereby the dispersibility of the titanium oxide in the vinyl chloride resin may be markedly improved. The object of the present invention cannot be achieved with a copolymer obtained by merely polymerizing vinyl chloride in the presence of titanium oxide.

Hereinafter, the present invention will be set forth in more detail.

DETAILED DESCRIPTION OF THE INVENTION

The modified titanium oxide is obtained by copolymerizing 30 to 2,000 parts of a monomer mixture comprising vinyl chloride and 0.1 to 70% of a carboxylic monomer in the presence of 100 parts of titanium oxide. A modified titanium oxide comprising more than 2,000 parts of the copolymer, if used for a vinyl chloride resin composition, impairs the thermal stability and other physical properties of the composition since the quantity of the vinyl chloride copolymer therein becomes excessive. Conversely, a modified titanium oxide comprising less than 30 parts is poorly dispersible in a vinyl chloride resin to be blended therewith since the quantity of the vinyl chloride copolymer is relatively insufficient.

The vinyl chloride copolymer obtained by polymerization in the presence of titanium oxide comprises 0.1 to 70% of the polymerized units of the carboxylic monomer. Less than 0.1% of the polymerized units results in a poor effect of improving the properties of the resin composition. More than 70% of these units is also undesirable because only minor improvements can be attained, and further because the fluidity and thermal stability of the vinyl chloride resin are impaired.

A vinyl chloride resin composition with improved weatherability as well as excellent processability and mechanical properties can be obtained by blending with a vinyl chloride resin the modified titanium oxide in such a quantity that the titanium oxide content of the resin composition (vinyl chloride resin plus modified titanium oxide) will be 0.1 to 30%. Especially, by adding an impact strength modifier as will be set forth later, a vinyl chloride resin composition having remarkable weatherability can be obtained without impairing the impact strength thereof as in the case of a composition comprising conventional titanium oxide.

If the titanium oxide content is less than 0.1%, no satisfactory effect of improving the weatherability of the resin composition can be obtained, while titanium oxide in excess of 30%, even if used in the form of modified titanium oxide, deteriorates the mechanical properties of the resin composition to cause plating out. Preferably, the modified titanium oxide is used in a quantity of 1 to 25% as the titanium oxide content of the resin composition.

Commercially available titanium oxide can be used in the present invention. In order to obtain improved weatherability, titanium oxide of the rutile-type crystal structure is preferable to that of the anatase-type structure.

While the average particle size of the titanium oxide is not limited to a specific size, it is preferred to use titanium oxide having a basic particle size of 0.01 to 0.5$\mu$.

For the carboxylic monomer to be copolymerized with vinyl chloride, which is essentially required to obtain the modified titanium oxide of the present invention, unsaturated monocarboxylic acids such as acrylic acid, methacrylic acid, 4-pentenoic acid, 5-hexenoic acid, 6-heptenoic acid, 7-octenoic acid, and 10-undecenoic acid; unsaturated polycarboxylic acids such as fumaric acid and itaconic acid; and monoalkyl esters of unsaturated polycarboxylic acids such as monoethyl itaconate and monobutyl itaconate can be used singly or in combination. Among these monomers, 10-undecenoic acid is particularly preferable.

It is essential in the present invention that a monomer mixture of a carboxylic monomer and vinyl chloride be subjected to copolymerization in the presence of titanium oxide. The polymerized units in the copolymer other than those of the carboxylic monomer ranging from 0.1 to 70% are ordinarily those of the vinyl chloride, but some of the polymerized units of the vinyl chloride can be replaced by those of a monomer copolymerizable with the vinyl chloride other than the carboxylic monomer in an amount such that up to 20% of the copolymer is the other copolymerizable monomer.

Examples of such monomers are alkyl methacrylates such as methyl methacrylate and ethyl methacrylate; aromatic vinyl compounds such as styrene and $\alpha$-methyl styrene; unsaturated nitriles such as acrylonitrile and methacrylonitrile; alkyl acrylates such as methyl acrylate and ethyl acrylate; vinylidene halides such as vinylidene chloride; vinyl esters such as vinyl acetate; and polyfunctional monomers such as divinylbenzene and diallyl phthalate.

A process for preparing the modified titanium oxide will now be set forth in detail.

First, titanium oxide is dispersed in water. Titanium oxide is readily dispersed in water to form a suspension, and the particle size of the suspended titanium oxide can be controlled by varying the pH of the aqueous dispersion system or adding dispersion aids, typically polyphosphates, or by mechanical agitation. It is preferable that the titanium oxide be suspended in water in the form of particles of a size of several or less microns.

To the suspension is added a monomer mixture of a carboxylic monomer and vinyl chloride, and the resulting mixture is subjected to polymerization. The copolymerization can be carried out either by polymerizing the whole monomer mixture at once, or by adding and polymerizing the mixture several times or continuously. In the latter case, the carboxylic monomer and vinyl chloride can be polymerized in varying ratios at the respective stages. For example, it is possible to first polymerize a monomer mixture comprising a carboxylic monomer as the principal constituent and vinyl chloride, and then polymerize a monomer mixture predominantly comprising vinyl chloride.

Either suspension polymerization or emulsion polymerization can be employed, but suspension polymerization is preferable from the standpoint of the recovery of the modified titanium oxide from the aqueous dispersion system.

The modified titanium oxide can be obtained by suspension polymerization in the form of particles of a size of about 1 to 200$\mu$ which may be varied depending on the polymerization conditions. Since the titanium oxide is uniformly encapsulated in the particles obtained by suspension polymerization, the modified titanium oxide can be recovered more easily than that obtained by emulsion polymerization.

Catalysts, suspension stabilizers and emulsifiers to be used in the suspension polymerization may be those commonly utilized in emulsion polymerization.

Examples of suitable catalysts for suspension polymerization are oil-soluble peroxides such as benzoyl peroxide and lauroyl peroxide; and azo compounds such as azobisisobutyronitrile and 2,2'-azobis-2,4-dimethylvaleronitrile.

Suspension stabilizers suitable for use in this invention include partially saponified polyvinyl acetate; polyvinyl alcohol; methyl cellulose; and calcium phosphate.

Examples of emulsifiers for emulsion polymerization are anionic emulsifiers such as sodium sulfosuccinate, dioctyl esters, and sodium alkylbenzenesulfonate; and nonionic emulsifiers such as polyethylene oxide.

Catalysts for emulsion polymerization are, for example, peroxides such as cumene hydroperoxide, and diisopropylbenzene hydroperoxide; and water-soluble compounds such as potassium persulfate and ammonium persulfate.

The vinyl chloride resins to be blended with the modified titanium oxide include, in addition to vinyl chloride homopolymers, copolymers of at least 70% of vinyl chloride and less than 30% of monoolefinic monomers copolymerizable therewith such as ethylene, propylene, vinyl acetate and methyl methacrylate; and chlorinated polyvinyl chloride resins.

If desired, the vinyl chloride resin composition comprising the modified titanium oxide according to the present invention may further comprise up to 20 parts of an impact strength modifier resin and up to 10 parts of a polymer processing aid respectively per 100 parts of the total of the vinyl chloride resin and the modified titanium oxide.

Examples of such impact strength modifier resins are ethylene/vinyl acetate copolymers; acrylonitrile/butadiene/styrene copolymers (ABS resins); methyl methacrylate/butadiene/styrene copolymers (MBS resins); alkyl acrylates/acrylonitrile/styrene copolymers (AAS resins); and chlorinated polyethylene.

Polymer processing aids that can be used in the present invention are, for example, methyl methacrylate resins of a high molecular weight; and copolymers of methyl methacrylate as the principal constituent and alkyl acrylates.

The modified titanium oxide is blended with the vinyl chloride resin in a conventional mixer such as a ribbon blender, Bumbury's mixer, roll mill or Henschel mixer, and the blend thus obtained is then molded through a molding machine such as an extruder or injection molding machine.

To the resin composition may be added conventional thermal stabilizers, photo-stabilizers, lubricants, plasticizers and pigments, if desired.

In order to indicate more fully the nature and utility of this invention, the following specific examples of practice constituting preferred embodiments of the invention and comparison examples are set forth, it being understood that these examples are presented as illustrative only and are not intended to limit the scope of the invention.

EXAMPLE 1

(A) Preparation of Modified Titanium Oxide

The following ingredients were charged into a 10-l autoclave provided with a stirrer.

| | Part |
|---|---|
| deionized water | 6,000 |
| titanium oxide, av. particle size 0.3μ (Ti-Pake R-930 supplied by Ichihara Sangyo, K.K., Japan) | 1,000 |
| 10-undecenoic acid | 40 |
| partially saponified polyvinyl acetate | 10 |
| 2,2'-azobis-2,4-dimethylvaleronitrile | 2 |

After the atmosphere within the autoclave was thoroughly purged with nitrogen, 2,000 parts of a vinyl chloride monomer was added. The resultant mixture was stirred preliminarily at 25° C. for 0.5 hour, and then subjected to polymerization at 57° C. for 8.5 hours. Upon the recovery of the unreacted vinyl chloride monomer, the polymerization was stopped.

The slurry obtained was dehydrated, washed with water, and dried. The polymerization yield was 90% relative to the monomer charged, and the polymer powder thus obtained comprised 35.3% of titanium oxide, the average particle size of modified titanium oxide being 40μ. The amount of the resultant copolymer was 1840 parts and the 10-undecenoic acid content therein was 1.1%.

This polymer powder was added to nitrobenzene, and allowed to swell at room temperature for 4 hours. From observation under an optical microscope, the titanium oxide was found to be uniformly incorporated in the polymer particles.

(B) Preparation of Vinyl Chloride Resin Composition

To 83 parts of vinyl chloride resin (average polymerization degree: 1,000) were added 11 parts of the modified titanium oxide obtained in the process (A) (3.9 parts as titanium oxide), 10 parts of an impact strength modifier (HIA-28: acrylate/butadiene/methyl methacrylate/styrene resin supplied by Kureha Kagaku Kogyo, K. K., Japan), and 3.0 parts of a lead-containing stabilizer (comprising 1.4 parts of lead stearate, 0.5 part of tribasic lead sulfate, 0.3 part of dibasic lead stearate, 0.6 part of calcium stearate, and 0.2 part of carbon black).

The resin composition obtained was kneaded with test rolls having a surface temperature of 140° C. for 20 sec. to prepare roll sheets. The resin exhibited good integration or binding, showing excellent processability.

Each of the roll sheets thus prepared was pressed at 200° C. and 150 kg/cm$^2$ to form a sheet of 3 mm thickness. This sheet was found to have a Charpy impact strength of 82 kg.cm/cm$^2$ (as measured in accordance with JIS K7111). The test specimen used for the measurement of the Charpy impact strength was irradiated with ultraviolet rays for 500 hours in a weather-ometer (Model WESUN-HC, mfd. by Suga Shikenki, K. K., Japan). The Charpy impact strength of this specimen after the irradiation was 75 kg.cm/cm$^2$, indicating a strength retentivity of 91%.

Separately, the resin composition obtained in the manner described above was extruded through a 19-mm$\phi$ single-screw extruder of a screw compression ratio of 3.8, a screw rotational frequency of 30 rpm, cylinder temperatures (in the extrusion direction) of 160° C. at the inlet, 185° C. at the middle portion and 180° C. at the outlet, and a die temperature of 195° C. to prepare square bars and examine the extrusion rate, torque, and plating out of titanium oxide on the surface of the extrudate.

The extrusion rate and the torque were 32 g/min. and 1.7 kg.m, respectively, and substantially no titanium oxide plated out on the surface of the extrudate.

COMPARISON EXAMPLE 1

A resin composition comprising 3.9 parts of titanium oxide instead of the modified titanium oxide of Example 1, 10 parts of an impact strength modifier (HIA-28), 3.0 parts of the above described lead-containing stabilizer, and 90.1 parts of vinyl chloride resin (polymerization degree: 1,000) was tested similarly as in Example 1.

The Charpy impact strength of this composition was 25 kg.cm/cm$^2$ while that of the composition of Example 1 was 82 kg.cm/cm$^2$.

The extrusion rate through the single-screw extruder and the torque were 23 g/min. and 2.3 kg.m, respectively, and numerous white spots due to the plating out of titanium oxide appeared on the surface of the extrudate in contrast to the composition of Example 1.

EXAMPLE 2 AND COMPARISON EXAMPLE 2

Modified titanium oxide was prepared by the process for the preparation of modified titanium oxide set forth in Example 1 except that the ratios between the vinyl chloride and 10-undecenoic acid copolymerized in the presence of titanium oxide were varied. The compositions of the modified titanium oxide thus prepared and the properties of resin compositions obtained by blending the modified titanium oxide with vinyl chloride resins in accordance with the recipe of Example 1 except that the titanium oxide content in each mixture of the vinyl chloride resin and the modified titanium oxide was controlled to be 3% are set forth in Table 1. In this Table 1 are also shown Comparison Examples wherein vinyl chloride alone and a mixture of vinyl chloride and a larger quantity of 10-undecenoic acid were polymerized in the presence of titanium oxide.

The modified titanium oxide prepared by polymerizing vinyl chloride alone (Comparison Example 2-6) contained an extremely small amount of titanium oxide notwithstanding that the same quantity of titanium oxide was used (because the titanium oxide bonded so loosely to the vinyl chloride resin polymerized in the presence thereof that a major part of the titanium oxide was separated and removed upon washing with water). Accordingly, by blending such modified titanium oxide with a vinyl chloride resin, a composition capable of preventing plating out while possessing satisfactory impact strength and extrusion processability could not be obtained.

On the other hand, the modified titanium oxide comprising more than 70% of the vinyl chloride copolymer of 10-undecenoic acid (Comparison Example 2-7) gave a resin composition having poor extrusion processability and impact strength, thus failing to give a vinyl chloride resin composition contemplated in the present invention.

TABLE 1

| | Composition of modified TiO$_2$ | | | | Properties of VC resin composition | | | |
| | | | | | Charpy impact strength (kg.cm/cm$^2$) | Extrudability through single-screw extruder | | |
| | | | | | | Plating out of TiO$_2$ on extrudate surface | Extrudability | |
| | TiO$_2$ (part) | VC (part) | uA (part) | Quantity of copolymer* (part) | | | Extrusion rate (g/min.) | Extrusion torque (kg.m) |
| Example | | | | | | | | |
| 2-1 | 50 | 91 | 1 | 184 | 76 | substantially none | 32 | 1.5 |
| 2-2 | 50 | 85 | 3 | 176 | 80 | substantially none | 32 | 1.6 |
| 2-3 | 50 | 75 | 10 | 150 | 79 | substantially none | 32 | 1.6 |
| 2-4 | 50 | 63 | 20 | 166 | 81 | substantially none | 31 | 1.7 |
| 2-5 | 50 | 50 | 34 | 168 | 75 | substantially none | 31 | 1.8 |
| Comparison Example | | | | | | | | |
| 2-6 | 4 | 91 | 0 | 2275 | 34 | notable | 29 | 1.7 |
| 2-7 | 50 | 20 | 65 | 170 | 45 | substantially none | 26 | 3.5 |

*per 100 parts by weight of TiO$_2$
TiO$_2$: titanium oxide (Tipake R-930, rutile type, supplied by Ishihara Sangyo, K.K., Japan.)
VC: vinyl chloride,
uA: 10-undecenoic acid

EXAMPLE 3 AND COMPARISON EXAMPLE 3

Table 2 shows the relationship between the quantity of the vinyl chloride/10 undecenoic acid copolymer constituting the modified titanium oxide and the performance of the modified titanium oxide.

It will be noted from this table that no less than 30 parts of the vinyl chloride/10 undecenoic acid copolymer per 100 parts of titanium oxide is required in order to obtain a resin composition capable of preventing plating out while possessing excellent impact strength and extrusion processability.

TABLE 2

| | Composition of modified TiO$_2$ | | | | Properties of VC resin composition*** | | | |
| | | | | | Charpy impact strength (kg.cm/cm$^2$) | Extrudability through single-screw extruder | | |
| | | | | | | Plating out of TiO$_2$ on extrudate surface | Extrudability | |
| | TiO$_2$ (part) | VC (part) | uA (part) | Quantity of copolymer* (part) | | | Extrusion rate (g/min.) | Extrusion torque (kg.m) |
| Example | | | | | | | | |
| 3-1 | 5 | 89 | 1.8 | 1816 | 78 | substantially none | 31 | 1.6 |
| 3-2 | 10 | 88 | 1.9 | 899 | 80 | substantially none | 32 | 1.7 |
| 3-3 | 25 | 89 | 1.7 | 363 | 77 | substan- | 32 | 1.7 |

TABLE 2-continued

| | Composition of modified TiO$_2$ | | | | Properties of VC resin composition*** | | | |
|---|---|---|---|---|---|---|---|---|
| | | | | | Charpy impact strength (kg.cm/cm$^2$) | Extrudability through single-screw extruder | | |
| | TiO$_2$ (part) | VC (part) | uA (part) | Quantity of copolymer* (part) | | Plating out of TiO$_2$ on extrudate surface | Extrudability | |
| | | | | | | | Extrusion rate (g/min.) | Extrusion torque (kg.m) |
| 3-4 | 50 | 88 | 1.9 | 179.8 | 76 | tially none substantially none | 31 | 1.7 |
| 3-5** | 100 | 89 | 1.8 | 89.8 | 65 | appreciable | 31 | 1.8 |
| 3-6 | 150 | 88 | 1.7 | 59.8 | 64 | appreciable | 30 | 1.9 |
| Comparison Example 3-7 | 350 | 88 | 1.7 | 25.6 | 33 | notable | 30 | 2.0 |

*Per 100 parts by weight of TiO$_2$
**Obtained by first adding and polymerizing a half of the monomer mixture of 10-undecenoic acid and vinyl chloride in the presence of TiO$_2$, and then adding and polymerizing the remaining half of the monomer mixture.
***Tested with resin compositions each obtained by adding the modified TiO$_2$ in such a quantity that the TiO$_2$ content in the VC resin composition would be 3%, the composition of the resin and the quantity of the stabilizer being in accordance with the recipe of Example 1.

EXAMPLE 4

Modified titanium oxides were respectively prepared by the procedure of Example 1 except that 10-undecenoic acid was replaced by acrylic acid, methacrylic acid, itaconic acid and monobutyl itaconate.

11 parts each of the modified titanium oxide thus prepared was blended with 83 parts of vinyl chloride resin (average polymerization degree: 1,000), 10 parts of HIA-28, and 3.0 parts of the lead-containing stabilizer used in Example 1, and the resin composition obtained was tested similarly as in Example 1. The results are set forth in Table 3 from which it is apparent that the same results as those achieved by the modified titanium oxide comprising 10-undecenoic acid could be obtained.

TABLE 3

| | Composition of modified TiO$_2$ | | | Properties of VC resin composition | | | |
|---|---|---|---|---|---|---|---|
| | | | | Charpy impact strength (kg.cm/cm$^2$) | Extrudability through single-screw extruder | | |
| | TiO$_2$ (part) | VC (part) | Unsaturated carboxylic acid (part) | | Plating out of TiO$_2$ on extrudate surface | Extrudability | |
| | | | | | | Extrusion rate (g/min.) | Extrusion torque (kg.m) |
| Example | | | | | | | |
| 4-1 | 50 | 89 | 1.7 (AA) | 76 | substantially none | 30 | 1.7 |
| 4-2 | 50 | 88 | 1.8 (MAA) | 75 | substantially none | 30 | 1.6 |
| 4-3 | 50 | 86 | 1.8 (IA) | 74 | substantially none | 31 | 1.7 |
| 4-4 | 50 | 89 | 1.8 (MBI) | 77 | substantially none | 30 | 1.7 |

AA: acrylic acid
MAA: methacrylic acid
IA: itaconic acid
MBI: monobutyl itaconate

EXAMPLE 5 AND COMPARISON EXAMPLE 4

Table 4 shows the titanium oxide content in a vinyl chloride resin composition comprising the modified titanium oxide obtained in Example 3-6 and the properties of the resin composition.

From this table it will be noted that the titanium oxide content in the vinyl chloride resin composition comprising the modified titanium oxide is a significant factor in order to obtain a resin composition capable of effectively preventing plating out while possessing excellent impact strength and extrusion processability. The titanium oxide content outside the scope of the present invention (Comparison Example 4-1) results in poorer impact strength and extrusion processability, and cannot prevent plating out.

TABLE 4

| TiO$_2$ content in VC resin composition (%) | Properties of VC resin composition | | | |
|---|---|---|---|---|
| | Charpy impact strength (kg.cm/cm$^2$) | Extrudability through single-screw extruder | | |
| | | Plating out of TiO$_2$ on extrudate surface | Extrudability | |
| | | | Extrusion rate (g/min.) | Extrusion torque (kg.m) |
| Example | | | | |
| 5-1 | 10 | 52 | appreciable | 28 | 2.3 |
| 5-2 | 20 | 33 | appreciable | 26 | 3.2 |
| Comparison Example | | | | |
| 4-1 | 35 | 9 | notable | 21 | 5.6 |

We claim:

1. A vinyl chloride resin composition comprising a vinyl chloride resin and modified titanium oxide and having a titanium oxide content of 0.1 to 30% by weight based on the total amount of said vinyl chloride resin and said modified titanium oxide, said modified titanium oxide having a particle size of about 1 to 200μ and having been obtained by suspension copolymerizing a monomer mixture of vinyl chloride and 10-undecenoic acid in the presence of titanium oxide, said modified titanium oxide comprising 30 to 2,000 parts by weight of the resulting copolymer with respect to 100 parts by weight of titanium oxide, said copolymer in said modified titanium oxide comprising 0.1 to 70% by weight of polymerized units of said 10-undecenoic acid based on the weight of said copolymer.

2. A vinyl chloride resin composition as claimed in claim 1, wherein the copolymer in the modified titanium oxide consists of 0.1 to 70% of the 10-undecenoic acid and the remainder of vinyl chloride.

3. A vinyl chloride resin composition as claimed in claim 1, wherein the copolymer in the modified titanium oxide further comprises up to 20% by weight of a monomer copolymerizable with the vinyl chloride other than the 10-undecenoic acid.

4. A vinyl chloride resin composition as claimed in claim 1, wherein the titanium oxide is of the rutile type.

5. A vinyl chloride resin composition as claimed in claim 1, wherein said resin composition comprises up to 20 parts by weight of an impact strength modifier resin per 100 parts by weight of the total of the modified titanium oxide and the vinyl chloride resin.

6. A vinyl chloride resin composition as claimed in claim 1, wherein said resin composition comprises up to 10 parts by weight of a polymer processing air per 100 parts by weight of the total of the modified titanium oxide and the vinyl chloride.

* * * * *